United States Patent
Girardeau, Jr. et al.

(10) Patent No.: US 7,907,212 B2
(45) Date of Patent: Mar. 15, 2011

(54) MULTIPLE PATH AUDIO VIDEO SYNCHRONIZATION

(75) Inventors: James Ward Girardeau, Jr., Austin, TX (US); Shawn Saleem, Toronto (CA)

(73) Assignee: ViXS Systems, Inc., Toronto, Ontario (CA)

( * ) Notice: Subject to any disclaimer, the term of this patent is extended or adjusted under 35 U.S.C. 154(b) by 1385 days.

(21) Appl. No.: 11/384,922

(22) Filed: Mar. 20, 2006

(65) Prior Publication Data

US 2007/0220561 A1    Sep. 20, 2007

(51) Int. Cl.
*H04N 9/475* (2006.01)

(52) U.S. Cl. .................................................. 348/515

(58) Field of Classification Search .......... 348/515–518, 348/510, 512, 500, 722, 725; 434/365
See application file for complete search history.

(56) References Cited

U.S. PATENT DOCUMENTS

| | | | | |
|---|---|---|---|---|
| 5,598,352 | A * | 1/1997 | Rosenau et al. | 715/203 |
| 5,603,016 | A * | 2/1997 | Davies | 713/400 |
| 5,808,722 | A * | 9/1998 | Suzuki | 352/12 |
| 5,815,634 | A * | 9/1998 | Daum et al. | 386/96 |
| 6,920,181 | B1 * | 7/2005 | Porter | 375/240.28 |
| 7,020,894 | B1 * | 3/2006 | Godwin et al. | 725/135 |
| 2006/0078305 | A1 * | 4/2006 | Arora et al. | 386/96 |
| 2007/0126929 | A1 * | 6/2007 | Han et al. | 348/515 |
| 2007/0166691 | A1 * | 7/2007 | Epstein | 434/365 |

* cited by examiner

*Primary Examiner* — Paulos M Natnael
(74) *Attorney, Agent, or Firm* — Garlick Harrison & Markison; Bruce E. Garlick

(57) ABSTRACT

Audio video synchronization begins by receiving an audio-video signal via a first communication path. The processing continues by capturing a representation of an audio component of the audio-video signal, wherein the audio component was rendered audible via a second communication path. The processing continues by deriving a reference representation of the audio component of the audio-video signal received via the first communication path. The processing continues by aligning a video component of the audio video-signal of the first communication path with the audio component of the audio video signal of the second communication path based on the representation of the audio component and the reference representation of the audio component.

20 Claims, 7 Drawing Sheets source 12 or A/V receiver 62 and server 52

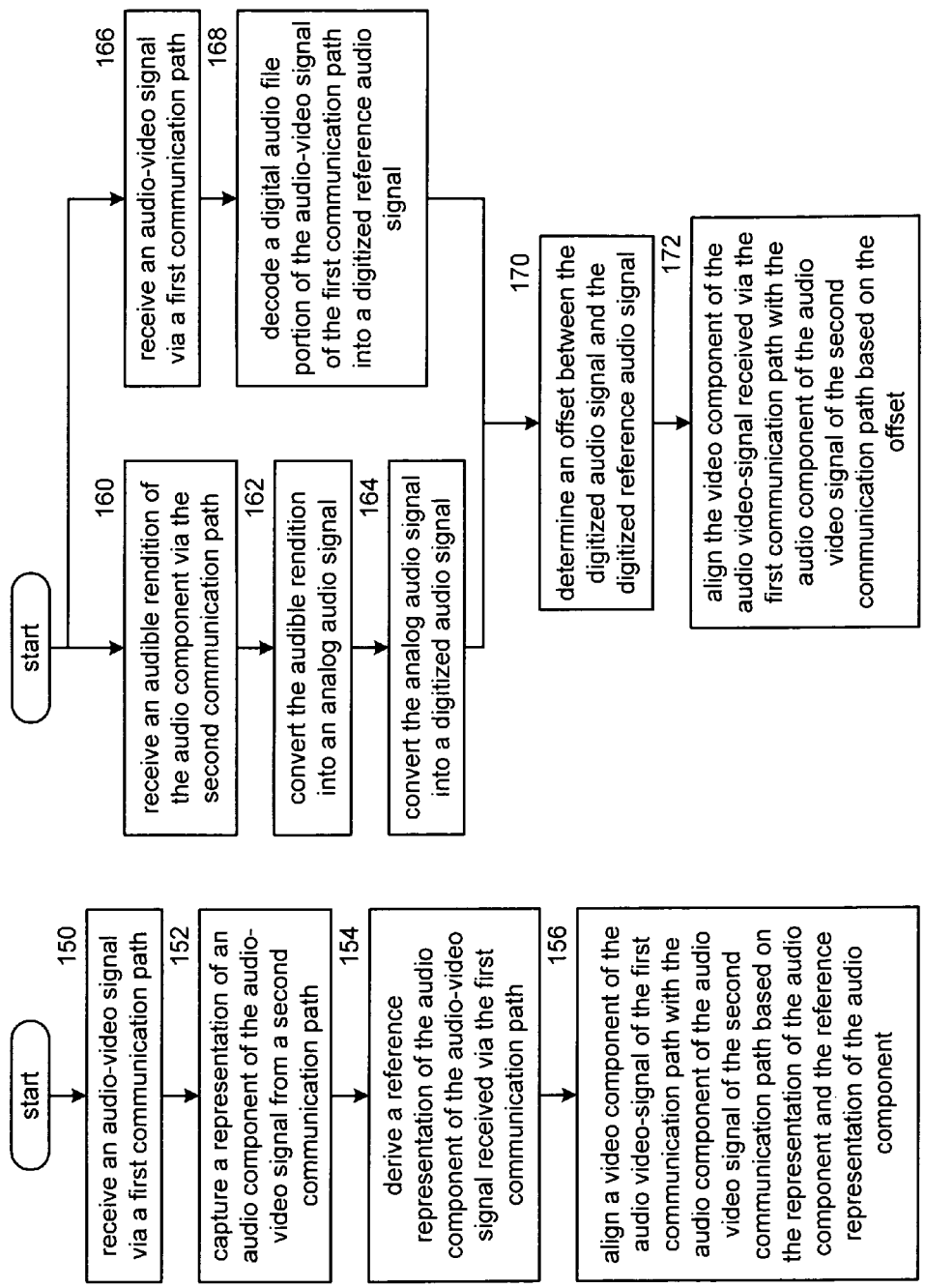

MULTIPLE PATH AUDIO VIDEO SYNCHRONIZATION

CROSS REFERENCE TO RELATED PATENTS

NOT APPLICABLE

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to multimedia systems and more particularly to audio video processing.

2. Description of Related Art

As is known, an entertainment system may range from a simple system (e.g., a television, a cable or satellite set top box, a DVD player and a few speakers) costing a few hundred dollars to an extravagant system (e.g., multiple projectors, multiple screens, multiple receivers, surround sound speakers in numerous rooms, computer control systems, etc.) costing in excessive of one-hundred thousand dollars. In most entertainment systems, the components of the system (e.g., the television, the receiver, etc.) are hard-wired into the system.

Recent advances in wireless local area networking, however, are providing a cost effective and efficient mechanism for replacing some of the hard-wire connections in an entertainment system. For example, streaming audio/video may be provided over a wireless communication path from an audio/video source (e.g., a set top box) to an audio/video destination (e.g., a television). In this example, the audio/video source and destination each include a wireless transceiver to facilitate the wireless communication. In addition, the television also includes video processing and audio processing to render the audio component of the streaming audio/video audible and to render the video component of the streaming audio/video visible.

An issue arises with the use of a wireless communication path, or for that matter a hard-wired communication path, when the audio component is provided for audio processing over a different communication path than the video component. For example, an entertainment system may include a hard-wired speaker system coupled to an A/V (audio/video) receiver of the system and a video monitor that is coupled to the A/V receiver via a wireless communication path. In this situation, synchronization may be off between the rendered audio via one path and the rendered video via another path, which is generally referred to as "lip sync". Lip sync issues arise due to processing time differences between the audio path and the video path.

One approach to resolve the lip sync issue is to provide a user tunable audio delay, which the user of the system manually adjusts to sync the video he or she is viewing with the audible sounds he or she is hearing. While such an approach reduces lip sync issues, it does not appeal to many customers. Further, if the processing delays of one or both of the communication paths change, the user must manually adjust the audio delay.

Therefore, a need exists for a more user friendly method and/or apparatus for synchronizing of audio and video in a multiple path system.

BRIEF DESCRIPTION OF THE SEVERAL VIEWS OF THE DRAWING(S)

FIG. 7 is a logic diagram of a method in accordance with the present invention; and FIG. 8 is a logic diagram of another method in accordance with the present invention.

DETAILED DESCRIPTION OF THE INVENTION

Figure 1:
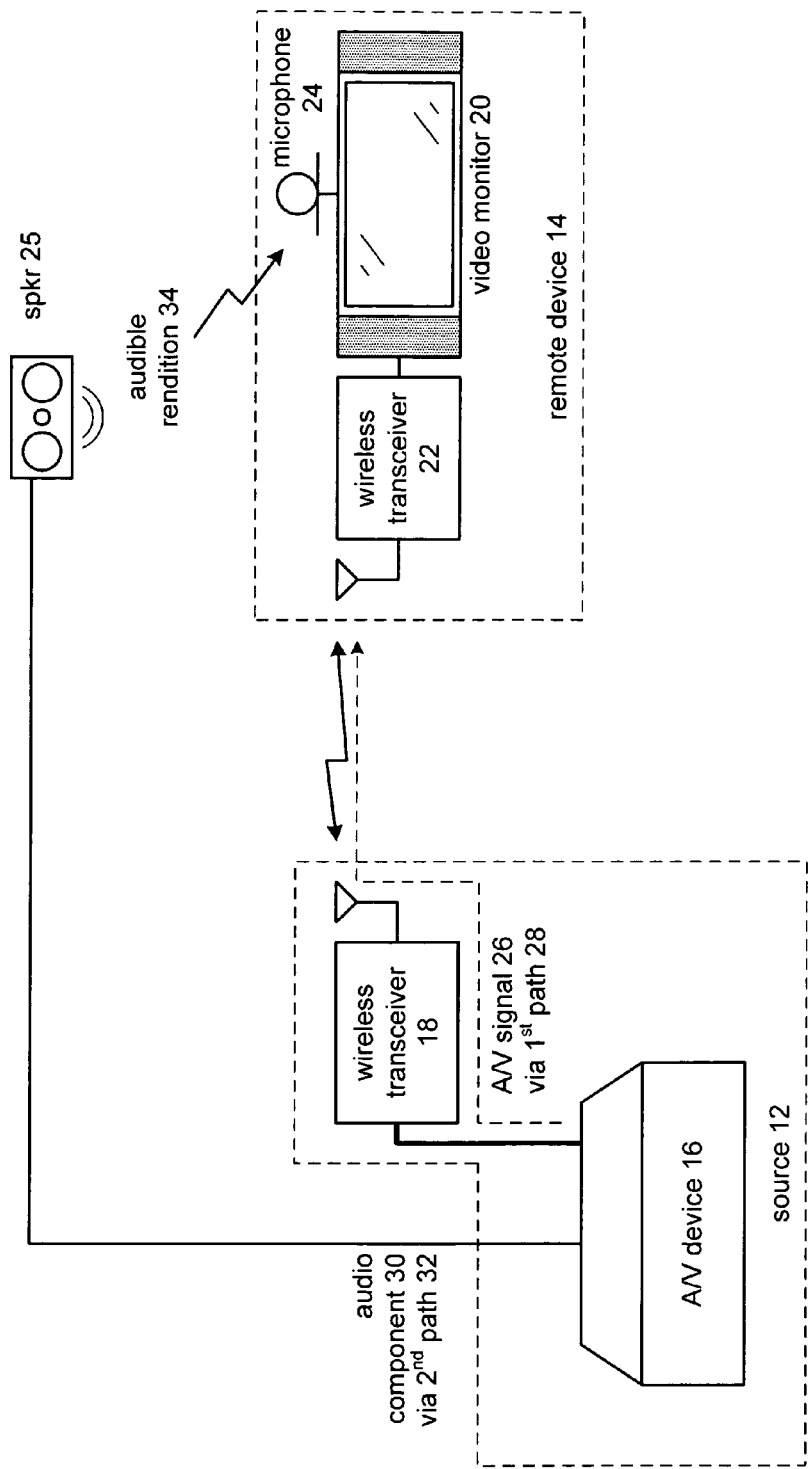
FIG. 1 is a schematic block diagram of a system in accordance with the present invention.

FIG. 1 is a schematic block diagram of an audio/video system 10 that includes a source 12, a remote device 14, and a speaker or speaker system 25. The source 12 includes an audio/video device 16 and a wireless transceiver 18, where the A/V device 16 is coupled to a speaker or speaker system 25. The remote device 14 includes a wireless transceiver 22, a video monitor 20, and a microphone 24.

In operation, the A/V device 16 provides audio/video signals 26 (e.g., playback of a DVD, satellite television program, cable television program, et cetera) via a $1^{st}$ path 28 to the remote device 14 and provides an audio component of the A/V signal 26 via a $2^{nd}$ path 32 to the speaker 25. The remote device 14 receives the audio/video signal 26 via the $1^{st}$ path 28 that includes the wireless transceiver 18, the wireless transceiver 22, and the wireless communication path there between.

The remote device 14 receives an audible rendition 34 of the audio component 30 of the A/V signal 26 via the microphone 24. In addition, the video monitor 20, or some other processing device within remote device 14, generates a reference representation of the audio component of the audio/video signal 26 that was received via the $1^{st}$ communication path. The video monitor 20, or other processing device within remote device 14, determines a timing offset between the audio component received via the $1^{st}$ communication path and the audio component received via the $2^{nd}$ communication path 32. This offset is then utilized by the remote device 14 and/or the source 12 to align the video component of the audio/video signal received via the $1^{st}$ path with the audio component received via the $2^{nd}$ path. The operation of the remote device 14 will be described in greater detail with reference to FIGS. 5, 7 and 8 and the source will be described in greater detail with reference to FIGS. 6-8.

Figure 2:
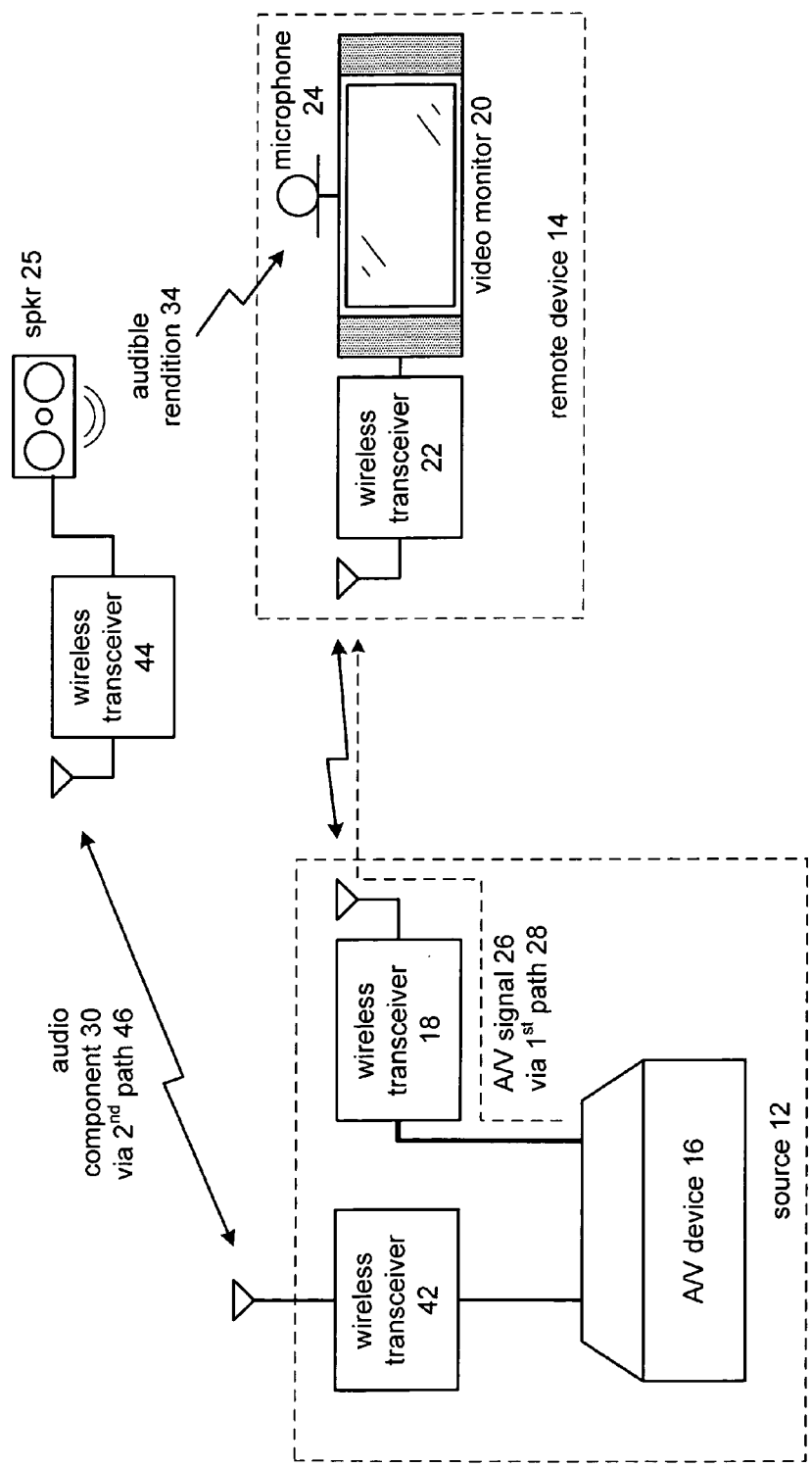
FIG. 2 is a schematic block diagram of another system in accordance with the present invention.

FIG. 2 is a schematic block diagram of another audio/video system 40 that includes source 12, remote device 14, and a wireless speaker system. The wireless speaker system includes a wireless transceiver 44 and the speaker or speaker system 25.

In this system, the A/V device 16 provides an A/V signal 26 via the 1$^{st}$ communication path to remote device 14 and provides an audio component 30 of the A/V signal 26 via a 2$^{nd}$ path 46 to the speaker system 25. In this embodiment, the 2$^{nd}$ path 46 includes wireless transceiver 42, wireless transceiver 44, and the wireless communication path there between.

The remote device 14 receives an audible rendition 34 of the audio component 30 via microphone 24. The video monitor 20, or some other processing device within remote device 14, determines an offset between the audio component 30 received via the 2$^{nd}$ path 46 and microphone 24 and the audio component of the A/V signal 26 received via the 1$^{st}$ path 28. The offset is used by the remote device 14 and/or the source 12 to align the video component of the A/V signal 26 transmitted via the 1$^{st}$ path 28 with the audio component 30 transmitted via the 2$^{nd}$ path 46.

Figure 3:
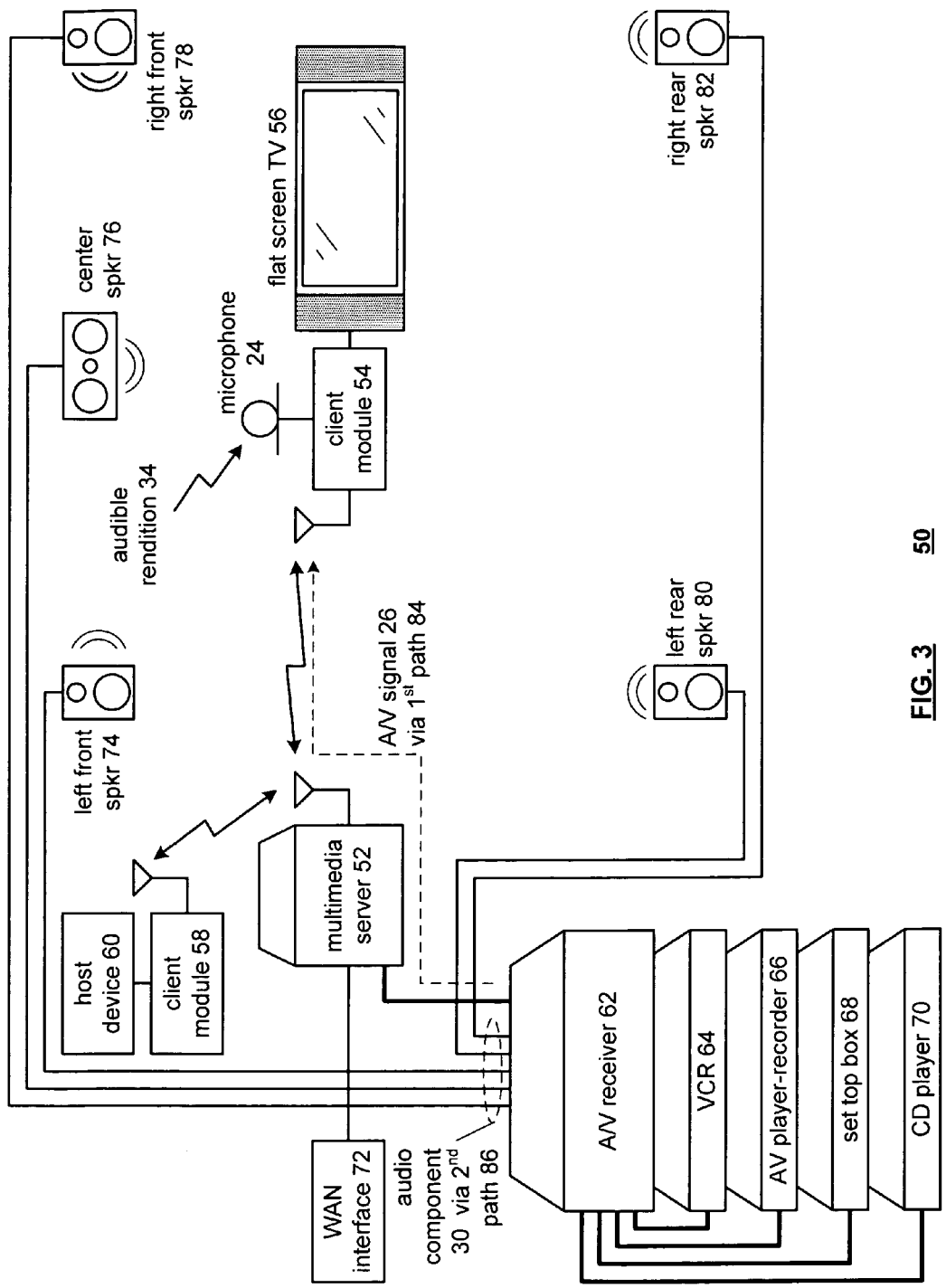
FIG. 3 is a schematic block diagram of yet another system in accordance with the present invention.

FIG. 3 is a schematic block diagram of another A/V system 50. In this embodiment, the system 50 includes a multimedia server 52, a client module 54, a flat screen TV 56, a 2$^{nd}$ client module 58, a host device 60, an A/V receiver 62, and surround sound speakers (speakers 74-82). As is shown, the A/V receiver 62 may be coupled to one or more of a video cassette recorder (VCR) 64, an audio/video player-recorder 66 (e.g., a DVD player/recorder), a set-top box 68 (e.g., a cable box, satellite box, et cetera) and/or a CD player 70.

The multimedia server 52 wirelessly provides audio and/or video signals to the client modules 54 and/or 58. Such a multimedia server 52 and client module 54 and 58 may function in accordance with the teachings of co-pending patent application entitled Method and Apparatus for a Multimedia System, having a filing date of May 24, 2001, and a Ser. No. 09/864,524 to provide the wireless communication path.

Client module 54, which is coupled to a flat screen TV 56 or other type of video monitor, receives audio/video signals 26 via a 1$^{st}$ communication path 84. The 1$^{st}$ communication path 84 includes a wireless transmission between multimedia server 52 and client module 54. The 1$^{st}$ path 84 further includes a connection between the multimedia server 52 and the A/V receiver 62. Accordingly, if the user of the flat screen TV 56 desires to watch playback of a DVD, the A/V receiver 62 provides an audio/video signal from the A/V player/recorder 66 to the multimedia server 52. The multimedia server 52, via a wireless transceiver, provides the A/V signal 26 to client module 54. A wireless transceiver within client module 54 recaptures the A/V signal 26 and provides a video component to the flat screen TV 56.

In this example application of system 50, the user of flat screen TV 56 desires the audio component to be provided through the surround sound speaker system, which includes speakers 74-82, as opposed to the speakers associated with the flat screen TV 56. In this application, microphone 24 receives an audible rendition of the audio component 30 of the A/V signal 26 that is transmitted via the 2$^{nd}$ communication path 86. The 2$^{nd}$ communication path 86 includes the wired or wireless coupling between the A/V receiver 62 and the surround sound speakers 74-82. The client module 54 converts the audible rendition 34 of the audio component 30 into a digitized audio signal and captures the audio component of the A/V signal 26 in a digitized audio format. The digitized audio format may be in accordance with any one of a plurality of digital audio formats including, but not limited to, pulse code modulation (PCM), motion picture expert group (MPEG) audio, DVD audio, et cetera. The client module compares the timing of the digitized audio of the audio component 30 received via the 2$^{nd}$ path 86 with the timing of the audio component of A/V signal 26 received via the 1$^{st}$ path 84. Based on a timing difference, the client module 54 generates an offset. The multimedia server, the A/V receiver 62 and/or the client module 54 utilize the offset to align the video component of A/V signal 26 with the audio component 30. The audio/video receiver 62, the multimedia server 52 will be described in greater detail with reference to FIGS. 6-8 and the client module 54 will be described in greater detail with reference to FIGS. 5, 7 and 8.

Figure 4:
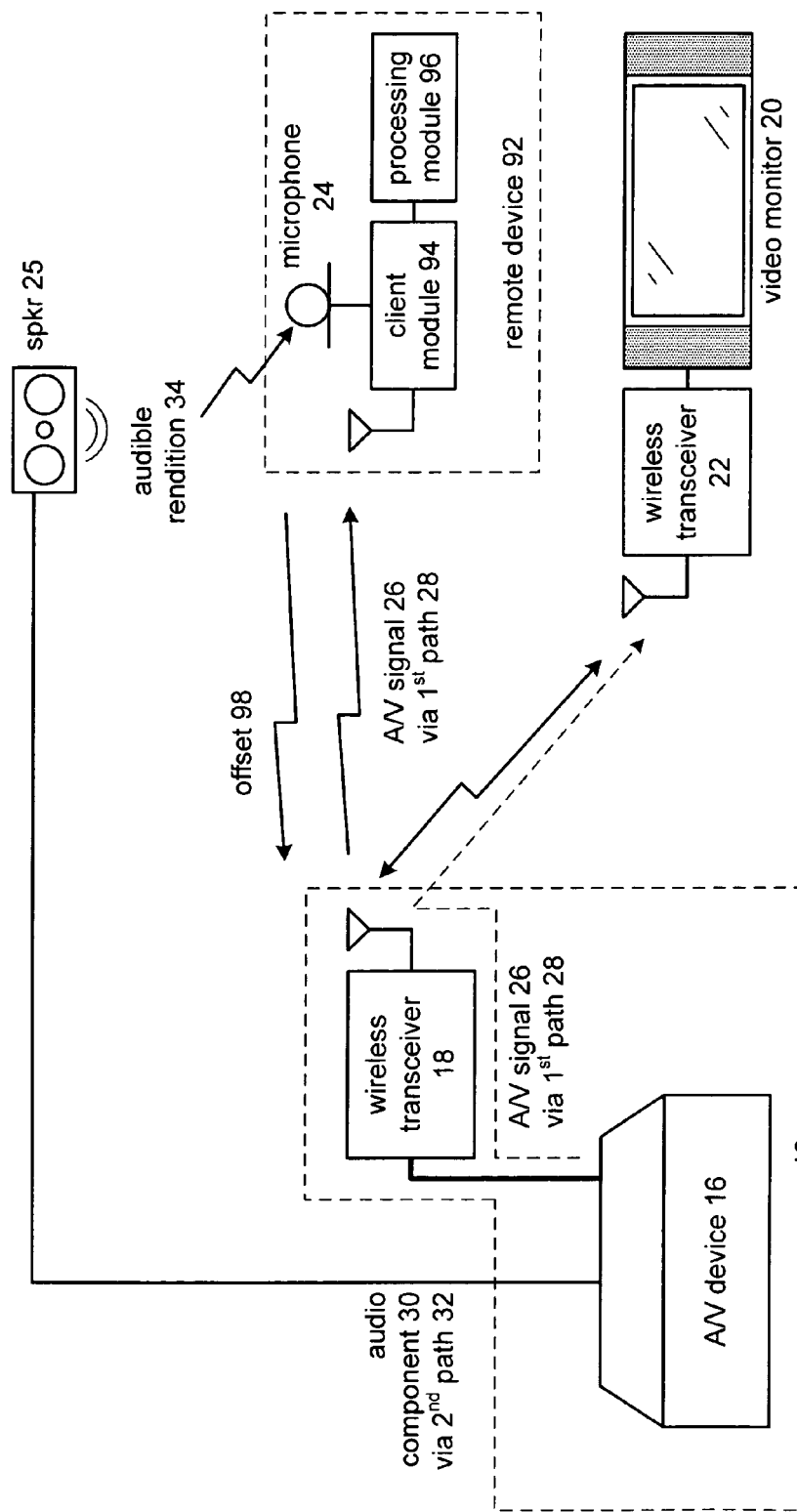
FIG. 4 is a schematic block diagram of a further system in accordance with the present invention.

FIG. 4 is a schematic block diagram of another audio/video system 90 that includes the source 12, a remote device 92, a wireless transceiver 22, a video monitor 20 and a speaker or speaker system 25. The remote device 92 includes a client module 94, a processing module 96 and a microphone 24.

In this embodiment, the video component of an A/V signal 26 is provided to the video monitor 20 via a 1$^{st}$ wireless communication path 28 while the audio component 30 of the signal is provided via a 2$^{nd}$ communication path 32 to the speaker system 25. In this embodiment, the remote device is a separate unit but physically located near the video monitor 20 to determine a timing offset between an audible rendition 34 of the audio component 30 received via the 2$^{nd}$ path 32 and an audio component of the A/V signal 26 received via the 1$^{st}$ path 28. In this instance, the processing module 96 determines the offset 98 and provides it to the source 12. The source 12 utilizes the offset to adjust the transmission timing of the audio component 30 via the 2$^{nd}$ path and the A/V signal 26 via the 1$^{st}$ path 28 such that, to the user, the video component being displayed on video monitor 20 is aligned, or synchronized, with the audible rendition 34 the user hears via speaker 25.

Figure 5:
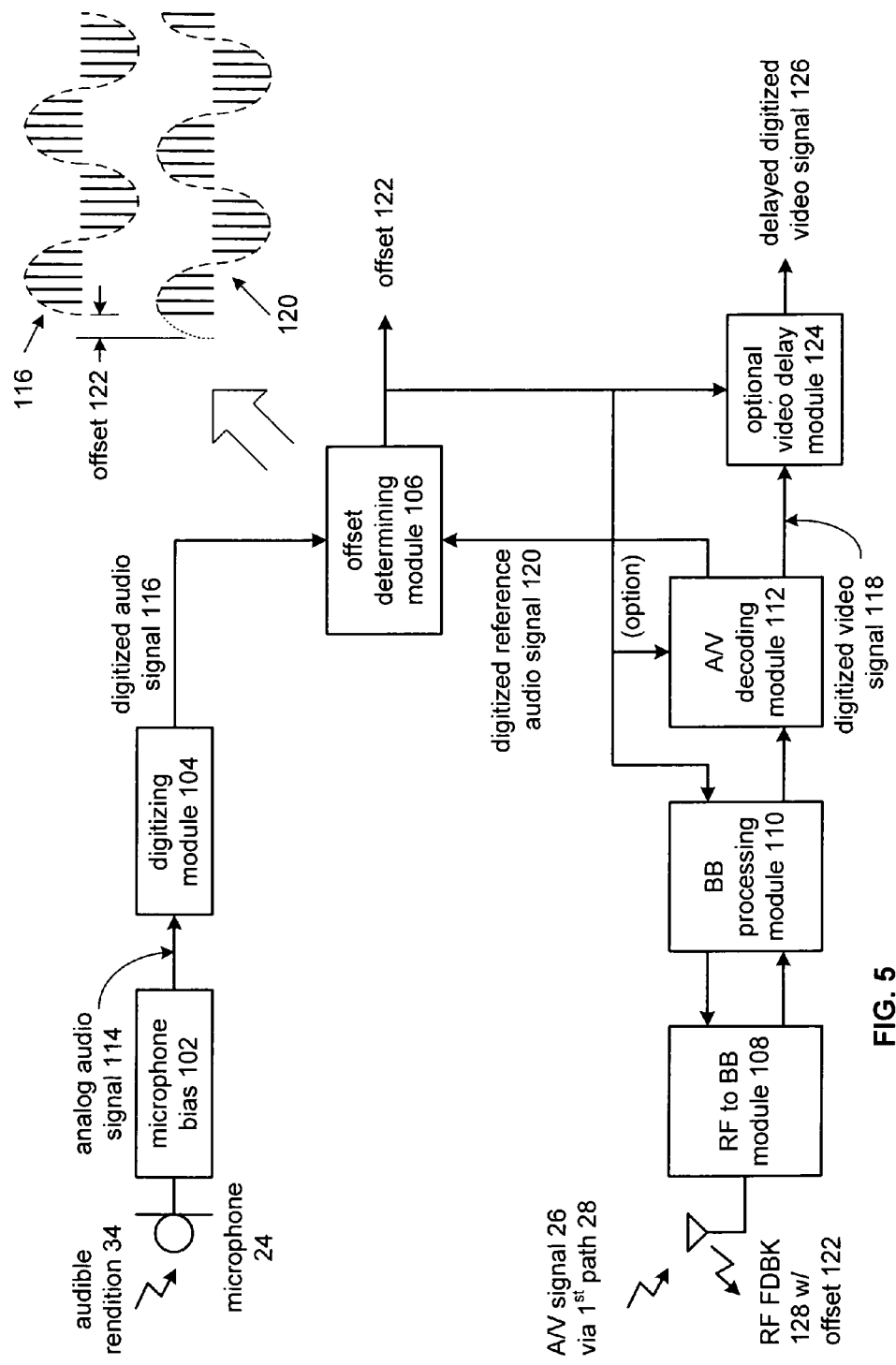
FIG. 5 is a schematic block diagram of a remote device and/or a client module in accordance with the present invention.

FIG. 5 is a schematic block diagram of remote device 14 or 90 and/or of the client module 54, which will be generally referred to as remote device. The remote device includes the microphone 24, a microphone biasing circuit 102, a digitizing module 104, an offset determining module 106, a radio frequency (RF) to baseband (BB) module 108, a baseband processing module 110, an audio/video (A/V) decoding module 112 and may optionally include a video delay module 124.

In operation, the audio/video signal 26 is received via the 1$^{st}$ path 28 by the RF to baseband module 108. The audible rendition of the audio component transmitted via the 2$^{nd}$ path is received by microphone 24. The RF to baseband processing module 108 converts the radio frequency signal that includes the A/V signal 26 into a baseband signal. The baseband processing module 110 recaptures the A/V signal 26 from the baseband signals. The RF to baseband module 108 and baseband processing module 110 perform the function of the transceiver, which may be done in accordance with one or more wireless communication protocols. For example, the transceiver may operate in accordance with IEEE802.11a standard.

The A/V decoding module 112 receives the recaptured audio/video signal 26 and decodes it to produce a digitized video signal 118 and a digitized reference audio signal 120. Note that the A/V decoding module 112 utilizes a decoding convention in accordance with the formatting of the A/V signal 26. For example, if the A/V signal 26 is received in an MPEG format, the A/V decoding module 112 will be compliant with the MPEG standard.

The microphone 24 receives the audible rendition 34 of the audio component that was transmitted via the 2$^{nd}$ path and provides it to the microphone bias circuit 102. The microphone bias circuit 102 converts the audible renditions 34 into an analog audio signal 114. The digitizing module 104 converts the analog audio signals 114 into a digitized audio signal 116. The digitizing module 104 may be a pulse code modulation (PCM) modulator, or a digitizing module in accordance with one or more AES (Audio Engineering Society) standards, EIAG (Electronic Industry Association of Japan) standards, an analog-to-digital converter, sample and hold circuit, et cetera. Note that, in one embodiment, the digitizing module 104 produces the digitized audio signal 116 in the same format as the A/V decoding module 112 produces the digitized reference audio signal 120.

The offset determining module 106 compares the digitized audio signal 116 with the digitized reference signal 120 to produce the offset 122. Since the digitized reference audio signal 120 is synchronized with the digitized video signal 118, the offset 122 corresponds to a timing offset between the digitized audio 116 and the digitized video signal 118. The offset determining module 106 may determine the offset by correlating at least a portion of a frequency range of the digitized audio signal with at least a portion of the frequency range of the digitized reference audio signal. For example, the correlation of the digitized audio signal with the digitized reference audio signal may be performed using the bass components, the center channel signal components, et cetera, of the respective signals.

Alternatively, the offset determining module 106 may interpret embedded frame information within the digitized reference audio signal 102 and the digitized audio signal 116 to determine the offset. For example, the source may embed a time-stamp in the A/V signal 26 transmitted via the $1^{st}$ path and the audio component 30 transmitted via the $2^{nd}$ path.

As another alternative, the offset determining module 106 may interpret signal properties of the digitized audio signal and the digitized reference audio signal to determine the offset. For example, the signal-to-noise ratio of each signal may be determined and then correlated to provide a confidants factor with respect to the offset calculation. As yet another alternative, the offset determining module 106 may interpret the peak levels, envelope and/or wave forms of the digitized audio signal and of the digitized reference audio signal to determine the offset.

In general, the various alternatives for determining the offset 122 are generally represented by the graphic of FIG. 5. As shown, the digitized audio signal 116 is shown as a plurality of digital impulses that collectively represent a sine wave. Similarly, the digitized reference audio signal 120 includes a plurality of digital impulses that collectively represent a sine wave.

If the two signals were synchronized, the phase of signal 116 would be aligned with the phase of signal 120. However, due to the propagation delay differences between the $1^{st}$ path and the $2^{nd}$ path, the digitized audio signal 116 is delayed in time with respect to the digitized reference audio signal 120. This difference in time corresponds to the offset 122. Note that the timing difference may have the digitized audio signal 116 leading or lagging the digitized reference audio signal 120.

The offset determining module 106 may provide the offset 122 back to the source 12 or server 52 and/or may utilize it locally to align the video component of the A/V signal 26 with the audio component 30 received via the $2^{nd}$ communication path. If the offset is being provided back to the source, the offset determining module 106 provides the offset 122 to the baseband processing module 110. The baseband processing module 110 converts the offset 122 into baseband symbols. The RF-to-baseband module 108 converts the baseband symbols of offset 122 into a radio feedback signal 128 that includes the offset 122. The source 12 and/or multimedia server 52 receive the RF feedback 128 via its corresponding wireless transceiver.

If the remote device utilizes the offset 122 locally to compensate for the timing differences, the offset may be provided to a optional video delay module 124 and/or to the A/V decoding module 112. In this example, the A/V decoding module 112 may utilize the offset to adjust the timing of the digitized video signal 118 based on the offset 122 such that, to the user, the delayed digitized video signal 126 is synchronized with the audio component 30 of the $2^{nd}$ communication path. Alternatively, the video delay module 124 may provide the corresponding delay to the digitized video signal 118 based on the offset to produce the delayed digitized video signal 126.

As yet another option, the offset 122 may be utilized by both the remote device and source device to compensate for the offset. In this example, the source utilizes a nominal offset to transmit the audio/video signal via the $1^{st}$ path and the audio component via the $2^{nd}$ path. The remote determines the alignment difference to produce the offset 122, which it then utilizes locally to make a $2^{nd}$ level of or fine tuning adjustment. With such an embodiment, the offset may be provided to the source 12 to adjust and/or select the nominal offset from a plurality of nominal offsets. Note that modules 102-106, 112 and 124 may be within the monitor, flat screen TV and/or within the client module.

Figure 6:
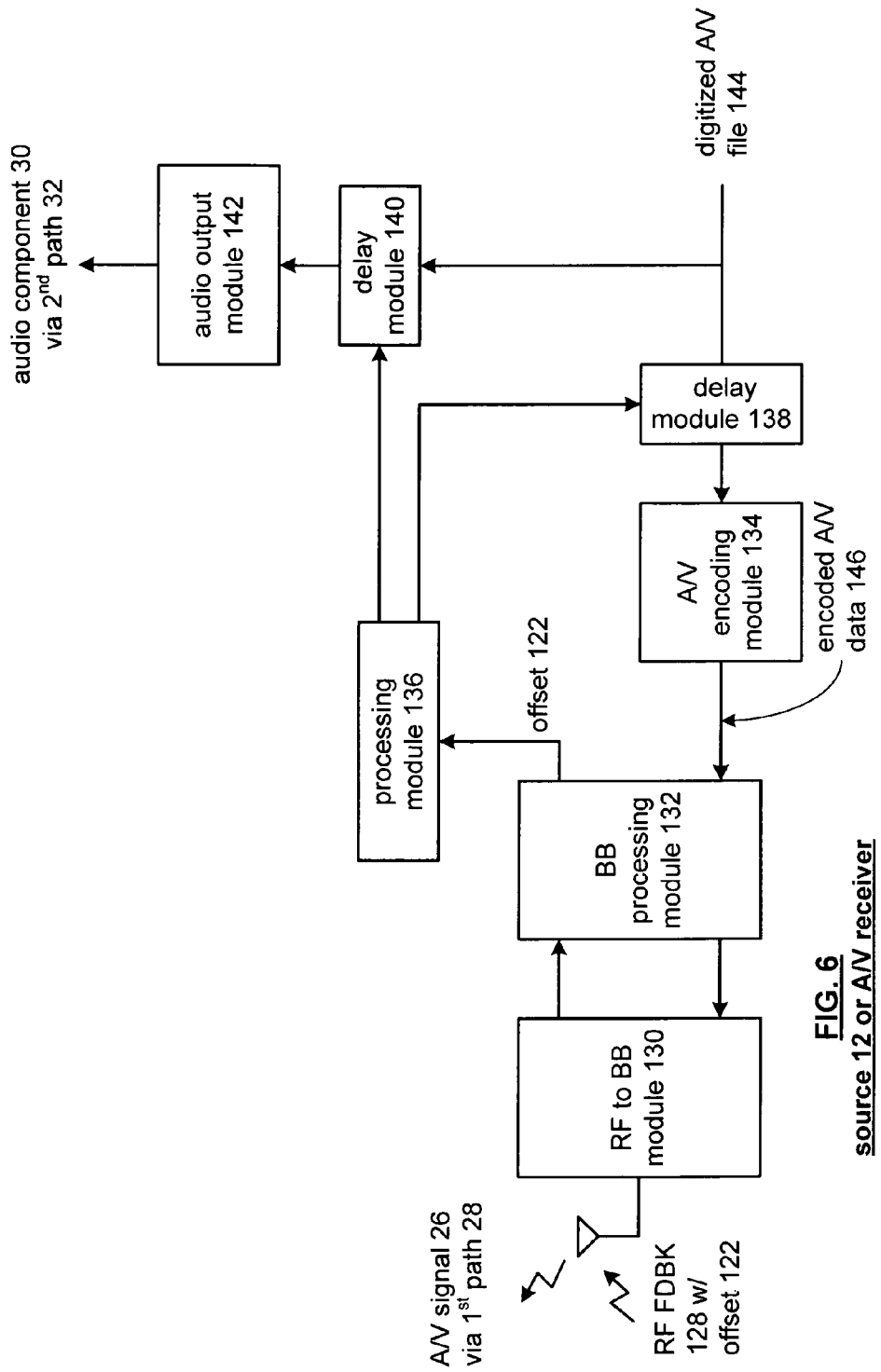
FIG. 6 is a schematic block diagram of a source, an A/V receiver and/or a server in accordance with the present invention.

FIG. 6 is a schematic block diagram of the source 12, or the A/V receiver 62 and server 52. As shown, the device includes an RF-to-baseband module 130, a baseband processing module 132, a processing module 136, an A/V encoding module 134, a delay module 138, a $2^{nd}$ delay module 140, and an audio output module 142. The processing module 136, as with any of the modules of any of the figures, the module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The module may include or be associated with a memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the module implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the module executes, operational instructions corresponding to at least some of the steps and/or functions illustrated in FIGS. 1-8.

In operation, the encoding module 134 encodes a digitized A/V file 144, which may be a DVD file, an MPEG file, a cable television program, a satellite program, an HDTV program, et cetera. The delay module 138 may delay the digitized A/V file 144 based on the offset to produce a delayed A/V file. The A/V encoding module 134, which is compliant with a particular standard used to produce the digitized A/V file 144, encodes the delayed A/V file to produce encoded A/V data 146.

The baseband processing module 132 receives the encoded A/V data 146 and produces baseband symbols thereof. The RF-to-baseband module 130 converts the baseband symbols into an RF signal that includes the A/V signal 26. The RF signal is then transmitted via the $1^{st}$ path. During the set-up of the A/V synchronization, the delay module 138 may be bypassed or provided with a default offset such that the timing difference between the first and second paths may be determined.

The RF-to-baseband module 130 receives the RF feedback signal 128 that includes offset 122. The RF-to-baseband module 130 converts the signal 128 into baseband symbols that are subsequently processed by the baseband processing module 132 to produce the offset 122. The processing module 136 processes the offset 122 to produce a delay signal component that is provided to delay module 138 and/or delay module 140. Note that the audio component of the digitized A/V file 144 is provided via delay module 140 and audio output module 142. In this instance, depending on whether the audio component 30 of the $2^{nd}$ communication path lags or leads the audio component of A/V signal 26 via the $1^{st}$ communication path 28, the processing module 136 activates delay module 140 or delay module 138. In this manner, the synchronization errors between the audio component 30 of the $2^{nd}$ communication path with the video component of A/V signal 26 via the $1^{st}$ communication path are compensated for within the source 12 and/or A/V receiver 62 and/or server 52.

FIG. 7 is a logic diagram of a method for synchronizing video components of transmitted via one path with audio components transmitted via a $2^{nd}$ path. The process begins at Step 150 where an audio/video signal is received via a $1^{st}$ communication path. The process then proceeds to Step 152 where a representation of an audio component of the audio/video signal is captured from a $2^{nd}$ communication path. The process then proceeds to Step 154 where a reference representation of the audio component of the audio/video signal received via the $1^{st}$ communication path is derived. The process then proceeds to Step 156 where the video component of the audio/video signal of the $1^{st}$ communication path is aligned with the audio component of the audio/video signal of the $2^{nd}$ communication path based on the representation of the audio component and the reference representation of the audio component.

FIG. 8 is a logic diagram of another method for synchronizing audio and video. The process begins at Steps 160 and 166. At Step 160, an audible rendition of the audio component is received via a $2^{nd}$ communication path. The process then proceeds to Step 162 where the audible rendition is converted into an analog audio signal. The process then proceeds to Step 164 where the analog audio signal is converted into a digitized audio signal.

At Step 166, the audio/video signal is received via a $1^{st}$ communication path. The process then proceeds to Step 168 where a digital audio file portion of the audio/video signal of the $1^{st}$ communication path is decoded into a digitized reference audio signal. The process then proceeds to Step 170 where an offset is determined between the digitized audio signal and the digitized referenced audio signal. The offset may be determined in one of a variety of ways. For instance, the offset may be determined by correlating and/or spectral aligning at least portion a frequency range of the digitized audio signal with at least portion a frequency range of the digitized reference audio signal.

As another example, the offset may be determined by interpreting embedded frame information (e.g., embedded time stamps, frame aligning information, etc.). As yet another example, the offset may be determined by interpreting signal properties of the digitized audio signal and the digitized reference audio signal. For example, signal to noise ratio may be interpreted. Still further, low or high signal amplitude might be used to turn off correlation. As yet another example, the offset may be determined by interpreting at least one of peak levels, envelopes, and waveforms of the digitized audio signal and the digitized reference audio signal.

The process then proceeds to step 172 where the video component of the audio/video signal received via the $1^{st}$ communication path is aligned with the audio component of the audio/video signal of the $2^{nd}$ communication path based on the offset. In one embodiment, the offset is provided to a transmitting source, which adjusts transmission of the audio-video signal via the first communication path and the transmission of the audio component of the audio video signal via the second communication path based on the offset such that for subsequent audio-video signals transmitted by the transmission source, the video component of the audio video-signal transmitted via the first communication path is substantially aligned with the audio component of the audio video signal transmitted via the second communication path.

In another embodiment, the source utilizing a nominal offset to transmit the audio-video signal via the first communication path and the audio component of the audio-video signal via the second communication path. The remote device then determines whether alignment differences between the video component of the audio video-signal of the first communication path and the audio component of the audio video signal of the second communication path are within a range of acceptable alignment differences. When the alignment differences are within the range of acceptable alignment differences, the offset is as the nominal offset such that no further timing adjustments are made. When the alignment differences are not within the range of acceptable alignment differences, the remote devices establishes the offset based on the nominal offset and the alignment differences. For instance, a delta time might be preloaded with a nominal value; a delta time might be constrained to pick only a certain range of values; a range of values might be preset determined by the room size or other parameters; and/or manual tuning might be used to "seed" the delta time, after that it automatically tracks.

In yet another embodiment, subsequent to the aligning of the video component of the audio video-signal received via the first communication path with the audio component of the audio video signal of the second communication path, the audio component of the audio-video signal may be rendered audible via at least one of a remote device that receives the audio component via the first communication path and a source device that receives the audio component via the second communication path. For instance, the remote device may play audio if the second communication path is muted, which may be automatically detected. As another example, some audio channels might be played by the remote device while others are played via the second communication path (i.e. a blended method and/or surround sound).

The source and/or remote device may update the aligning of the video component of the audio video-signal received via the first communication path with the audio component of the audio video signal of the second communication path. For example, hystorisys may be added to the determining of the offset such that once A/V synchronization is locked, an error threshold needs to be exceeded before the offset is changed. In addition, the rate of change may be controlled and well as the timing of when a change may occur (e.g., periodic, when a channel is changed, when a source A/V is changed, etc.).

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a plurality of method and apparatus for aligning video and audio that are transmitted via separate paths. As one of ordinary skill in the art will appreciate, other embodiments may be derived from the teaching of the present invention without deviating from the scope of the claims.

What is claimed is:

1. A method comprises:
   receiving an audio-video signal via a first communication path;
   capturing a representation of an audio component of the audio-video signal, wherein the audio component was rendered audible via a second communication path;
   deriving a reference representation of the audio component of the audio-video signal received via the first communication path; and
   aligning a video component of the audio video-signal of the first communication path with the audio component of the audio video signal of the second communication path by determining an offset between the representation of the audio component and the reference representation of the audio component and aligning the video component of the audio video-signal received via the first communication path with the audio component of the audio video signal of the second communication path based on the offset.

2. The method of claim 1, wherein the capturing the representation comprises:
   receiving an audible rendition of the audio component via the second communication path;
   converting the audible rendition into an analog audio signal; and
   converting the analog audio signal into a digitized audio signal.

3. The method of claim 2, wherein the deriving a reference representation of the audio component comprises:
   decoding a digital audio file portion of the audio-video signal into a digitized reference audio signal to provide the reference representation of the audio component.

4. The method of claim 3, wherein the aligning the video component of the audio video-signal received via the first communication path with the audio component of the audio video signal of the second communication path comprises:
   determining the offset between the digitized audio signal and the digitized reference audio signal; and
   aligning the video component of the audio video-signal received via the first communication path with the audio component of the audio video signal of the second communication path based on the offset.

5. The method of claim 4, wherein the determining the offset comprises at least one of:
   correlating at least portion a frequency range of the digitized audio signal with at least portion a frequency range of the digitized reference audio signal;
   interpreting embedded frame information;
   interpreting signal properties of the digitized audio signal and the digitized reference audio signal; and
   interpreting at least one of peak levels, envelopes, and waveforms of the digitized audio signal and the digitized reference audio signal.

6. The method of claim 4 further comprises:
   providing the offset to a transmitting source of the audio-video signal; and
   adjusting transmission of the audio-video signal via the first communication path and the transmission of the audio component of the audio video signal via the second communication path based on the offset such that for subsequent audio-video signals transmitted by the transmission source, the video component of the audio video-signal transmitted via the first communication path is substantially aligned with the audio component of the audio video signal transmitted via the second communication path.

7. The method of claim 4, wherein the determining the offset comprises at least one of:
   utilizing a nominal offset to transmit the audio-video signal via the first communication path and the audio component of the audio-video signal via the second communication path;
   determining whether alignment differences between the video component of the audio video-signal of the first communication path and the audio component of the audio video signal of the second communication path are within a range of acceptable alignment differences; and
   when the alignment differences are within the range of acceptable alignment differences, setting the offset as the nominal offset.

8. The method of claim 7 further comprises:
   when the alignment differences are not within the range of acceptable alignment differences, establishing the offset based on the nominal offset and the alignment differences.

9. The method of claim 1 further comprises:
   subsequent to the aligning of the video component of the audio video-signal received via the first communication path with the audio component of the audio video signal of the second communication path:
      rendering the audio component of the audio-video signal audible via at least one of a remote device that receives the audio component via the first communication path and a source device that receives the audio component via the second communication path.

10. The method of claim 1 further comprises:
    updating the aligning of the video component of the audio video-signal received via the first communication path with the audio component of the audio video signal of the second communication path.

11. A system comprises:
a source for providing an audio-video signal via a first communication path and an audio component of the audio-video signal via a second communication path; and
a remote device for capturing a representation of the audio component of the audio-video signal from the second communication path, wherein at least one of the source and the remote device aligns a video component of the audio video-signal provided via the first communication path with the audio component of the audio video signal provided via the second communication path by determining an offset between the representation of the audio component and a reference representation of the audio component of the audio-video signal provided via the first communication path and aligning the video component of the audio video-signal received via the first communication path with the audio component of the audio video signal of the second communication path based on the offset.

12. The system of claim 11, wherein the remote device further functions to capture the representation by:
receiving an audible rendition of the audio component via the second communication path;
converting the audible rendition into an analog audio signal; and
converting the analog audio signal into a digitized audio signal.

13. The system of claim 12, wherein at least one of the remote device and the source further functions to:
generate the reference representation of the audio component of the audio-video signal provided via the first communication path by decoding a digital audio file portion of the audio-video signal into a digitized reference audio signal to provide the reference representation of the audio component.

14. The system of claim 13, wherein the at least one of the remote device and the source align the video component of the audio video-signal received via the first communication path with the audio component of the audio video signal of the second communication path by:
determining the offset between the digitized audio signal and the digitized reference audio signal; and
aligning the video component of the audio video-signal received via the first communication path with the audio component of the audio video signal of the second communication path based on the offset.

15. The system of claim 14, wherein the at least one of the remote device and the source determine the offset by at least one of:
correlating at least portion a frequency range of the digitized audio signal with at least portion a frequency range of the digitized reference audio signal;
interpreting embedded frame information;
interpreting signal properties of the digitized audio signal and the digitized reference audio signal; and
interpreting at least one of peak levels, envelopes, and waveforms of the digitized audio signal and the digitized reference audio signal.

16. The system of claim 14, wherein the at least one of the remote device and the source further functions to:
provide the offset to a transmitting source of the audio-video signal; and
adjust transmission of the audio-video signal via the first communication path and the transmission of the audio component of the audio video signal via the second communication path based on the offset such that for subsequent audio-video signals transmitted by the transmission source, the video component of the audio video-signal transmitted via the first communication path is substantially aligned with the audio component of the audio video signal transmitted via the second communication path.

17. The system of claim 14, wherein the at least one of the remote device and the source further functions to determine the offset by at least one of:
utilizing a nominal offset to transmit the audio-video signal via the first communication path and the audio component of the audio-video signal via the second communication path;
determining whether alignment differences between the video component of the audio video-signal of the first communication path and the audio component of the audio video signal of the second communication path are within a range of acceptable alignment differences; and
when the alignment differences are within the range of acceptable alignment differences, setting the offset as the nominal offset.

18. The system of claim 17, wherein the at least one of the remote device and the source further functions to:
when the alignment differences are not within the range of acceptable alignment differences, establish the offset based on the nominal offset and the alignment differences.

19. The system of claim 11 further comprises:
subsequent to the aligning of the video component of the audio video-signal received via the first communication path with the audio component of the audio video signal of the second communication path:
the remote device rendering the audio component of the audio-video signal received via the first communication path audible; and
the source rendering the audio component of the audio-video signal provided via the second communication path audible.

20. The system of claim 11, wherein the at least one of the remote device and the source further functions to:
update the aligning of the video component of the audio video-signal provided via the first communication path with the audio component of the audio video signal provided via the second communication path.

* * * * *